United States Patent Office 2,891,983
Patented June 23, 1959

2,891,983

STABILIZED ORGANIC ISOCYANATES

Albert Bloom, Summit, N.J., Harlan B. Freyermuth, Easton, Pa., and James B. Normington, Little Silver, N.J., assignors to General Aniline & Film Corporation, New York, N.Y., a corporation of Delaware No Drawing. Application April 5, 1956
Serial No. 576,239

12 Claims. (Cl. 260—453)

The present invention relates to organic isocyanate compositions which are stable against polymerization.

Organic isocyanates are usually prepared by the reaction of phosgene with aliphatic and aromatic amines in an organic solvent such as, for example, o-dichlorobenzene at a temperature within the range of 50–200° C. The reaction product thus obtained may be degassed by treatment with an inert gas and then subjected to fractional distillation of the solvent under vacuum to separate the isocyanate in relatively pure form.

Organic isocyanates begin to polymerize soon after they are prepared. In other words, they react with themselves to form dimers and polymers. Dimer and polymer formation is highly undesirable since they would give rise to by-products when reacted with organic compounds containing active hydrogen atoms.

In order to avoid polymerization of organic isocyanates it has been proposed to stabilize them by the addition of an acyl halide, such as acetyl chloride in an amount of 0.3% to 5% based on the weight of the isocyanate, by the addition of carbamyl chloride in an amount from 0.02% to 0.06% of hydrolyzable chlorine based on the weight of the isocyanate, and by the addition of a phosphorus halide such as phosphorus trichloride or pentachloride in an amount from 0.05% to 5% based on the weight of the isocyanate.

It is the object of the present invention to provide organic isocyanate compositions which will be stable against polymerization over extended periods of time and can be stored.

Other objects and advantages will become evident from the following description.

We have discovered that organic isocyanates are readily stabilized against polymerization by dissolving small amounts of phosgene in the isocyanate. Proportions as low as 0.01 to 1.0% of phosgene by weight of the organic isocyanate are sufficient to effectively inhibit the polymerization tendencies. Inasmuch as the proportions are not critical, the exact proportion to be utilized with any particular isocyanate may be readily ascertained by a simple routine test.

As examples of organic mono-, di-, and triisocyanates that may be stabilized in accordance with the present invention, the following are illustrative:

Phenyl isocyanate
2-chloro phenyl isocyanate
4-phenyl phenyl isocyanate
4-benzyl phenyl isocyanate
p-Phenethyl isocyanate
α-Naphthyl isocyanate
β-Naphthyl isocyanate
Hexylisocyanate
Decamethylene diisocyanate
Butylene-1,3-diisocyanate
Butylene-2,3-diisocyanate
Cyclo-hexylene-1,2-diisocyanate
Hexamethylene diisocyanate
Ethylene diisocyanate
m-Phenylene diisocyanate
p-Phenylene diisocyanate
o-Phenylene diisocyanate
2,4-toluene diisocyanate
2,6-toluene diisocyanate
Methylene-bis(4-phenyl isocyanate)
1-chloro-2,4-phenylene diisocyanate
Diphenyl-3,3'-dimethyl-4,4'-diisocyanate
Diphenyl-3,3'-dimethoxy-4,4'-diisocyanate
1,3-phenylene diisocyanate
p-Dixylyl methane-4,4'-diisocyanate
1-methyl-phenylene-2,4-diisocyanate
Naphthalene 1,4-diisocyanate
Naphthalene 1,5-diisocyanate
Xylylene diisocyanate
4,4',4''-triphenyl methane triisocyanate
Benzene-1,2,4-triisocyanate
Triisocyanate made from p-fuchsin From the foregoing listing, which includes mono-, di-, and tri-aliphatic, and aromatic isocyanates, it is to be noted that the nature or character of the substituent in the aliphatic chain, or in the aromatic ring is immaterial. All such compounds can be stabilized with the aforementioned amounts of phosgene.

In order to more clearly illustrate the invention and to show the preferred modes of carrying the same into effect, and the advantages resulting therefrom, the following examples are given:

Example I

Samples of 4-benzyl phenyl isocyanate, p-phenethyl isocyanate, and α-naphthyl isocyanate, were dissolved in dry o-dichlorobenzene to form 40% solutions. These solutions were each divided into two parts. To one part of each solution was added 0.06% of phosgene based on the weight of the isocyanate. 10 parts of this solution were then added to a dry test tube. The test tubes were immediately stoppered with a Saran wrap seal and stored at room temperature for 3 days and then observed for sediment due to polymerization. The controls, i.e. containing no phosgene began to deposit dimer, trimer and polymer crystals while no crystals were observed in the isocyanate solutions to which phosgene was added. The test tubes were allowed to stand on the bench for several weeks, and further deposition of crystals was observed in the control test tubes. No crystals, however, deposited in the isocyanate solutions containing the small amount of phosgene.

Example II

Crude methylene-bis (4-phenyl isocyanate) was distilled under vacuum. 60 grams of the purified product were mixed with 60 grams of o-dichlorobenzene. 0.05% of phosgene based on the weight of the bis-isocyanate was added to 10 parts of the solution in a dry test tube. 60 grams of a distilled product were dissolved in 60 grams of o-dichlorobenzene and 10 parts thereof placed in a dry test tube and stoppered with a Saran wrap seal to serve as a control. The control and the isocyanate stabilized with the phosgene were stored at room temperature for 3 days, then observed for formation of sediment. The control showed a deposit of polymer crystals at the end of the third day; whereas the stabilized sample showed no crystals. Both test tubes were allowed to stand on the laboratory bench for 3 weeks and during this time observed each day for crystal formation. The control test tube showed an additional amount of crystal formation; whereas the stabilized sample showed no crystal deposits.

Example III 60 grams of toluene diisocyanate, consisting of 80% of the 2,4 and 20% of the 2,6 isomer, were mixed with 60 grams o-dichlorbenzene. 0.06% phosgene based on the weight of diisocyanate was added to 10 parts of the solution of diisocyanate in a dry test tube. The test tube was immediately stoppered with a Saran wrap seal. Several controls were made up in the same manner without the addition of phosgene. The test tubes were stored at room temperature for 3 days and then observed for sediment due to polymerization. The controls began to deposit polymer crystals, while no crystals were observed in the diisocyanate solution to which phosgene was added. The test tubes were allowed to stand on the bench for several weeks and further deposition of crystals was observed in the control test tubes and no crystals deposited in the diisocyanate solution containing phosgene.

Instead of employing o-dichlorbenzene as the solvent-diluent, other organic solvents, such as kerosene, benzene, xylene, carbon tetrachloride, chlorobenzene, nitrobenzene, and the like may be employed. It is to be noted that the nature or character of the solvent is immaterial so long as it is capable of dissolving an organic isocyanate or diisocyanate and is not reactive therewith. Mixtures of such solvents may also be employed where they are compatible.

Example IV

To 100 grams of toluene diisocyanate containing 80% of the 2-4 isomer and 20% of the 2-6 isomer were added 0.01% of phosgene. The phosgene may be added as a gas, as a liquid, or as a measured amount of a solution of phosgene in the toluene diisocyanate. The material was allowed to stand at room temperature for three to four weeks. No polymer formation was evident whereas a sample of the same toluene diisocyanate that contained no phosgene showed the presence of solid polymer after 3 days.

Example V

Example IV was repeated with the exception that the toluene diisocyanate contained 65% of the 2-4 isomer and 35% of the 2-6 isomer.

Example VI

Example IV was repeated with the exception that the amount of phosgene was replaced by 0.06%.

Example VII

Example IV was repeated with the exception that 100 grams of toluene diisocyanate mixture was replaced by 100 grams of methylene-bis-4-phenyl isocyanate.

Example VIII

Example IV was again repeated with the exception that the toluene diisocyanate mixture was replaced by 100 grams of triisocyanate prepared from p-fuchsin.

Example IX

Example IV was again repeated with the exception that 100 grams of toluene diisocyanate mixture was replaced by 100 grams of phenyl isocyanate.

In order to ascertain the efficiency of phosgene as a stabilizing agent when compared with an acyl halide and with a phosphorus halide, the following experiment was conducted, and the results compared.

Example X

Samples of toluene diisocyanate containing 80% of the 2,4-isomer and 20% of the 2,6-isomer were stabilized with 0.5% acetyl chloride, 0.5% of phosphorus trichloride and 0.5% of phosgene, and allowed to stand at room temperature for 3 weeks. Similar samples were prepared and stored at 50° C. for 3 days. After the time interval had elapsed, it was observed that the samples, i.e. stored at 50° C. for 3 days and those allowed to stand at room temperature which were stabilized with the acetyl chloride turned yellow, thus indicating that decomposition of the isocyanate took place. The samples stabilized with phosphorus chloride became turbid due to the formation of polymer, whereas the samples containing phosgene were entirely unchanged. Control samples containing no stabilizer showed a deposit of solid polymer.

We claim:

1. A composition of matter comprising an organic isocyanate selected from the class consisting of aliphatic and aromatic isocyanates containing from 0.01 to 1.0% by weight of phosgene.

2. The organic isocyanate composition of claim 1 wherein the isocyanate is 4-benzyl phenyl isocyanate.

3. The organic isocyanate composition of claim 1 wherein the isocyanate is p-phenethyl isocyanate.

4. The organic isocyanate composition of claim 1 wherein the isocyanate is $\alpha$-naphthyl isocyanate.

5. The organic isocyanate composition of claim 1 wherein the isocyanate is methylene-bis(4-phenyl isocyanate).

6. The organic isocyanate composition of claim 1 wherein the isocyanate is toluene diisocyanate.

7. The method of retarding the polymerization of an organic isocyanate selected from the class consisting of aliphatic and aromatic isocyanates which comprises adding thereto from 0.01 to 1.0% by weight of phosgene.

8. The method according to claim 7 wherein the isocyanate is 4-benzyl phenyl isocyanate.

9. The method according to claim 7 wherein the isocyanate is p-phenethyl isocyanate.

10. The method according to claim 7 wherein the isocyanate is $\alpha$-naphthyl isocyanate.

11. The method according to claim 7 wherein the isocyanate is methylene-bis(4-phenyl isocyanate).

12. The method according to claim 7 wherein the isocyanate is toluene diisocyanate.

References Cited in the file of this patent

UNITED STATES PATENTS

| | | |
|---|---|---|
| 2,437,867 | Verbanc | Mar. 16, 1948 |
| 2,476,779 | Sturgis | July 19, 1949 |
| 2,480,089 | Slocombe et al. | Aug. 29, 1949 |
| 2,620,349 | Slocombe | Dec. 2, 1952 |
| 2,683,144 | Balon et al. | July 6, 1954 |
| 2,683,160 | Irwin | July 6, 1954 |

OTHER REFERENCES

Monsanto Technical Bulletin No. p-145, Oct. 15, 1950 (p. 2), "Isocyanate-Based Adhesives."

Monsanto Technical Bulletin No. p-125, Oct. 1, 1951 (p. 8), "Isocyanates."